(12) United States Patent
Bravo et al.

(10) Patent No.: US 7,538,303 B2
(45) Date of Patent: May 26, 2009

(54) DEVICE FOR THE CONTROLLED AND QUICK HEATING OF FLUID MATERIAL, IN PARTICULAR FOOD

(75) Inventors: Genesio Bravo, Vicenza (IT); Alessandro Sonego, Sacile-Pordenone (IT)

(73) Assignee: BRAVO S.p.A., Vicenza (IT)

( * ) Notice: Subject to any disclaimer, the term of this patent is extended or adjusted under 35 U.S.C. 154(b) by 0 days.

(21) Appl. No.: 11/791,435

(22) PCT Filed: Jan. 13, 2006

(86) PCT No.: PCT/EP2006/000339

§ 371 (c)(1),
(2), (4) Date: May 22, 2007

(87) PCT Pub. No.: WO2006/079464

PCT Pub. Date: Aug. 3, 2006

(65) Prior Publication Data

US 2008/0128410 A1    Jun. 5, 2008

(30) Foreign Application Priority Data

Jan. 28, 2005    (IT)    .......................... MI2005A0117

(51) Int. Cl.
*H05B 6/80*    (2006.01)
(52) U.S. Cl. .......................... 219/687; 219/688; 99/403
(58) Field of Classification Search ......... 219/687–689, 219/731, 746, 748, 749, 694, 756, 762, 761; 99/451, DIG. 14; 426/107, 241, 243; 422/21
See application file for complete search history.

(56) References Cited

U.S. PATENT DOCUMENTS

| 3,663,783 | A | * | 5/1972 | McKague et al. | ........... 219/710 |
| 3,668,358 | A | | 6/1972 | Stenstrom | |
| 4,436,973 | A | * | 3/1984 | Ikeda et al. | .................. 219/751 |
| 4,629,847 | A | * | 12/1986 | Gics | ........................... 219/694 |
| 4,996,403 | A | | 2/1991 | White et al. | |
| 5,363,749 | A | | 11/1994 | Hurley et al. | |
| 5,998,773 | A | | 12/1999 | Jerby et al. | |
| 2004/0020923 | A1 | | 2/2004 | Collins et al. | |
| 2006/0006171 | A1 | * | 1/2006 | Sedlmayr | .................... 219/688 |

FOREIGN PATENT DOCUMENTS

WO    WO 87/05093    *    8/1987    ................. 219/688

OTHER PUBLICATIONS

International Search Report, May 3, 2006.

* cited by examiner

*Primary Examiner*—Quang T Van
(74) *Attorney, Agent, or Firm*—James V. Costigan; Hedman & Costigan, P.C.

(57) ABSTRACT

A device for the quick heating of fluid material, in particular food, comprises: a container (20) for the fluid material and a heater (12). According to the invention said heater consists of a microwave generator (12), or magnetron, equipped at one end with an antenna (13). Said container (20) comprises a treatment body (21) equipped with at least one recess (24) for the passage of said fluid material to be treated and with a seat (23) for receiving said antenna (13), said recessed treatment body (21) being enclosed in an airtight outer structure (28, 29).

17 Claims, 3 Drawing Sheets

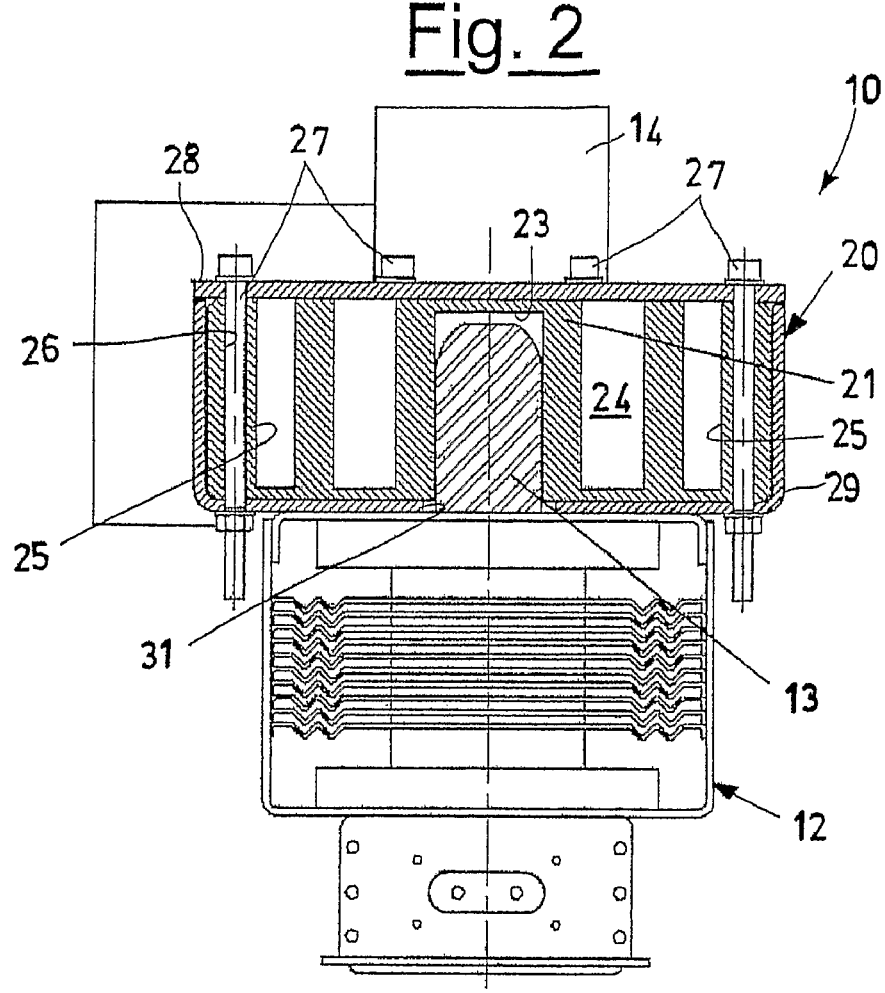
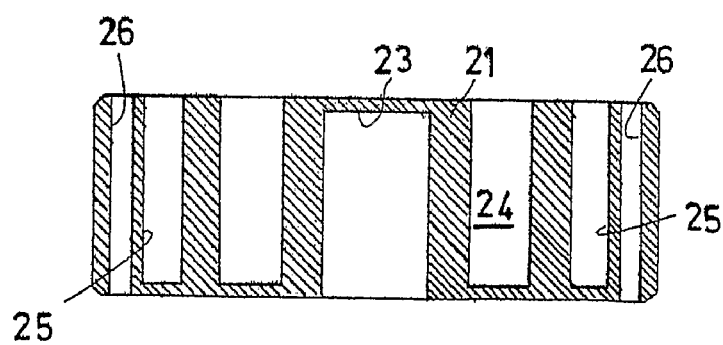

DEVICE FOR THE CONTROLLED AND QUICK HEATING OF FLUID MATERIAL, IN PARTICULAR FOOD

The present invention refers to a device for the controlled and quick heating of fluid material, in particular food.

In addition to just heating the fluid material for food, it can be integrated in a cooling device for completing the pasteurisation of fluid food products. An example of heating of fluid material for food can consist of the pasteurisation of milk, or of a water and powdered milk solution or of other liquid mixtures. As an example, which still does not limit the invention, we can consider one of the conditions of pasteurisation of milk that are preferably carried out for example by raising the temperature of a flow rate of milk equal to about 300 grams per minute to 85°, from which it can be worked out that the theoretical power necessary to complete such a thermal rise is equal to 1530 watt/hour.

Currently, in the field of machines for producing soft ice-cream the only heating system on a machine is used to sanitise all of the parts in contact with the product. This operation is carried out roughly every 10 days, where the whole thing is brought to a high temperature for a given period.

Such a system ensures that the machine is partially cleaned, but does not ensure that the machine introduced is hygienic.

Particularly in these machines, in which pasteurisation is just a first step of the product treatment process, it is necessary for the mixture to be heated and cooled rapidly and for such a device to have low bulk.

The general purpose of the present invention is to solve the aforementioned drawbacks of the prior art in an extremely simple, cost-effective and particularly functional manner.

Another purpose is to make a device for the controlled and quick heating of fluid material, in particular food, which is as small as possible.

A further purpose is to make a device for the controlled and quick heating of fluid material, in particular food, that is reliable and easy to clean even through cleaning cycles with hot water and sanitizers directly in the hydraulic circuits.

Since it concerns machines for producing soft ice-cream, the main purpose is to make a device for the controlled and quick heating of fluid material, which feeds the stirring cylinder whenever a dose (otherwise known as a cone) of ice-cream is removed and restores the amount just removed very quickly. Of course, this would always keep the machine fully loaded with a hygienically sterilised product without having to carry out other more complex and less efficient procedures. In view of the aforementioned purposes, according to the present invention, it has been thought of to make a device for the controlled and quick heating of fluid material, in particular food, having the characteristics outlined in the attached claims.

The structural and functional characteristics of the present invention and its advantages compared to the prior art shall become clearer from an examination of the following description, referring to the attached drawings, which show a device for the controlled and quick heating of fluid material, in particular food, made according to the innovative principles of the same invention.

In the drawings:

FIG. 2 shows the device of FIG. 1 partially sectioned;

FIG. 4 is a section view of the container body of FIG. 3 according to the line IV-IV;

Figure 1:
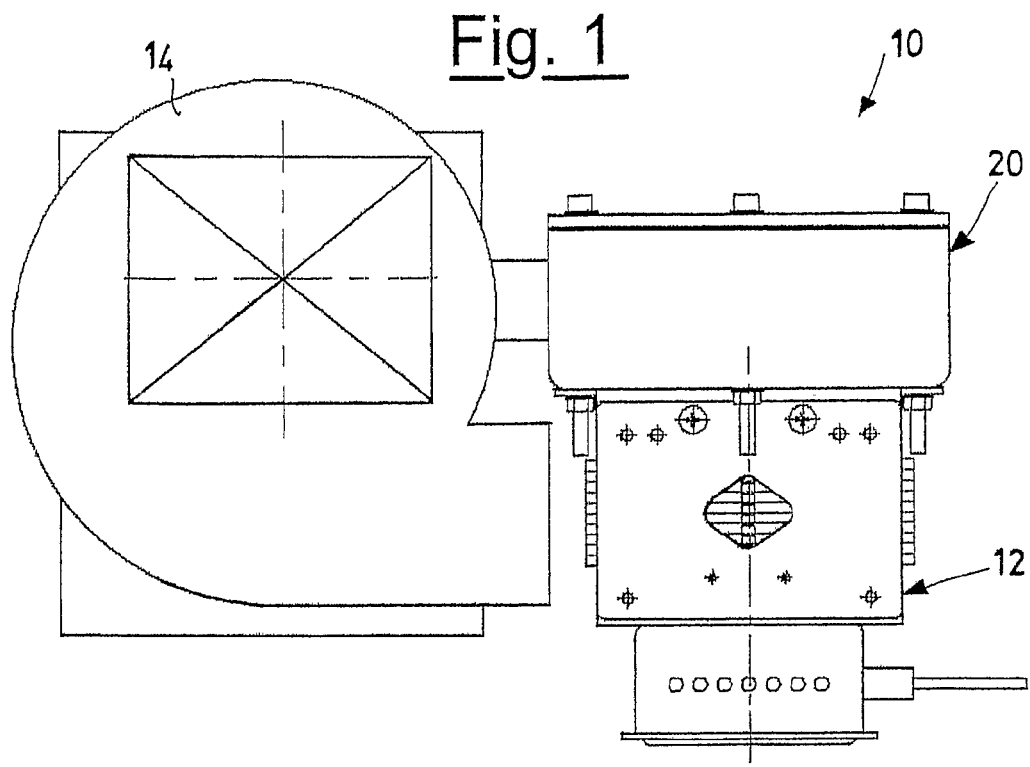
FIG. 1 shows a top side view of a device for the controlled and quick heating of fluid material, in particular food, of the present invention.

With reference to the drawings, a device for the controlled and quick heating of fluid material, in particular food, in object is wholly indicated with 10, and in the illustrated example, according to the present invention, comprises a container 20 for the fluid material to be treated and a heater 12.

The heater 12 consists of a microwave generator, or magnetron, equipped with an antenna 13 projecting at one end, as shown in the section of FIG. 2, cooled with air for example through a centrifugal generator 14, and capable of delivering an electroradiation power of about two kilowatt hours.

Indeed, purely as a non-limiting example of the invention, in the particular case in which the heating is carried out for the pasteurisation of milk, or rather of a water and powdered milk solution, the working conditions foresee that the controlled temperature of a flow rate of milk equal to about 300 grams per minute be raised for example up to 85° C. The power to be supplied to the system, worked out from the amount of heat necessary to obtain such a thermal rise in a mass of 300 grams, over a time of one minute, is equal to a theoretical power equal to 1530 watt/hour.

It should be remembered that in this case to complete the pasteurisation cycle, the mixture, after heating and at the outlet of the device, shall immediately pass into a heat exchanger where it shall be cooled down to +4° C. or in a different embodiment it can pass fro the heater directly into the cylinder below where it shall pass directly and in the quickest way from +85° C. to +4° C., in both cases the cooling shall continue to −9° C. The container 20 of the device for the controlled and quick heating of fluid material, in particular food, object of the present invention, comprises a treatment body 21 for the flow of the fluid to be treated equipped with recesses and enclosed in an outer structure positioned at the end of the microwave generator 12 provided with an antenna and in particular about the antenna 13 itself.

The recessed body 21, which is made from a food-safe material transparent to microwaves, according to a preferred embodiment can be obtained through milling from a block of polytetrafluoroethylene (PTFE), or else can be formed with the appropriate moulding means, from glass, Pyrex or ceramic, or other elements that possess characteristics such as to avoid contamination in whatever working condition.

Figure 3:
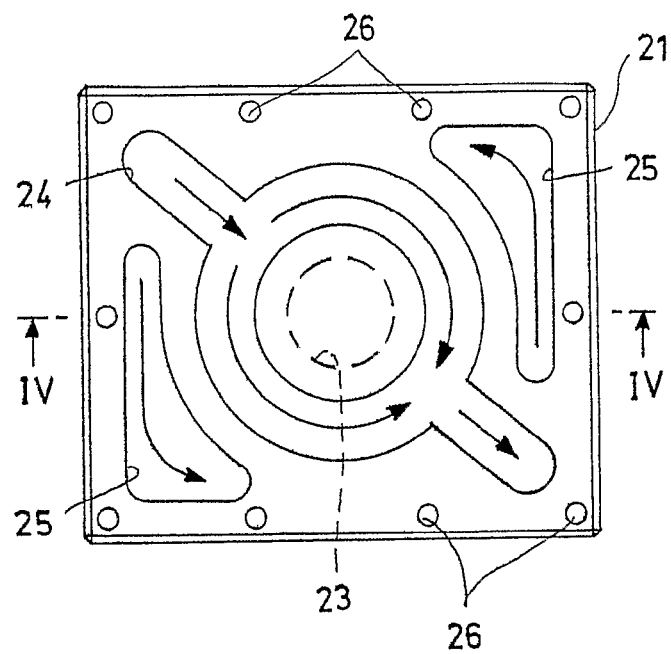
FIG. 3 is a plan view of a body for containing the device of FIG. 1.

In the geometric centre of the body 21, which in the example shown in FIGS. 3 and 4 is parallelepiped in shape, a seat 23 is formed to receive the antenna 13 of the microwave generator 12.

On the opposite face of the body 21 a recess 24 is formed for the passage of the fluid material to be treated, substantially annular in shape and arranged coaxially about the seat 23 of the antenna 13.

This arrangement indeed allows the absorption of the electroradiation energy by the fluid material to be treated to be optimised, avoiding excessive dispersions.

The body 21 is also equipped with at least one additional recess 25 for the continuous passage of a protection load for the absorption of energy, preferably consisting of water.

Indeed, if the radiation is carried out without any absorption, i.e. without the fluid in treatment, the reflected energy returning to the microwave generator substantially decreases its useful life, wearing it in very short periods of time.

If the heating device object of the present invention, in some instances, carries out the radiation without the fluid material to be treated being in the body 21, the energy going out from the microwave generator is, at least partially, absorbed by the water that can circulate continuously or in alternating flow with the mixture in the additional recesses 25.

The additional recesses 25 for the continuous passage of a protection load, in the same way as the annular recess 24, are also made on the opposite face with respect to the seat 23 for receiving the antenna 13 of the microwave generator 12, in order to avoid the fluid in treatment being able to come into contact with the antenna 13, by effect of the pressure with which it is injected into the cavity.

In the preferred embodiment, shown as an example in the figures, the additional recesses 25 and the seat 23 for receiving the antenna 13 are arranged on opposite sides with respect to the annular recess 24 so as not to subtract radiations from the fluid material to be treated. In particular, as shown in FIG. 3, the additional recesses 25 are arranged on diametrically opposite sides with respect to the annular recess 24. Finally, in the recessed body 21, along the perimeter, it is possible to make a plurality of through holes 26, intended to receive bolts 27 that clamp a removable cover 28 on a box-shaped casing 29 of the recessed body 21, making the airtight seal of the outer structure against fluid losses to the outside. Moreover, the cover 28 is clamped onto the top face of the recessed body 21, making the seal of the recesses to avoid the mixing of the fluid material to be treated with the water (FIG. 2).

Figure 5:
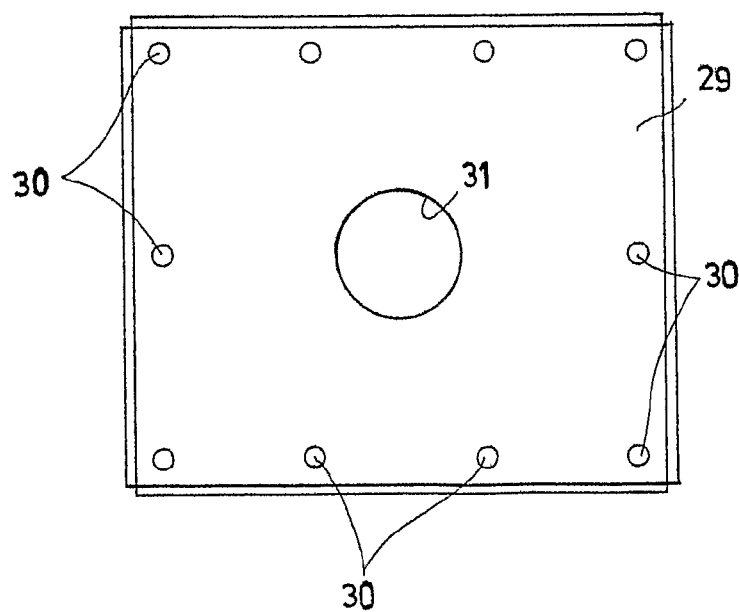

The box-shaped casing 29, shown in plan in FIG. 5 and in section in FIG. 2, which is for example made by bending and welding along the edges a sheet of stainless steel plate of a thickness for example equal to four millimetres, has a plurality of holes 30 on the bottom at those made in the recessed body 21 for the bolts 27. The box-shaped casing 29, as shown in the section of FIG. 2, is also provided with a central through hole 31 for receiving the antenna 13 of the microwave generator 12.

Figure 6:
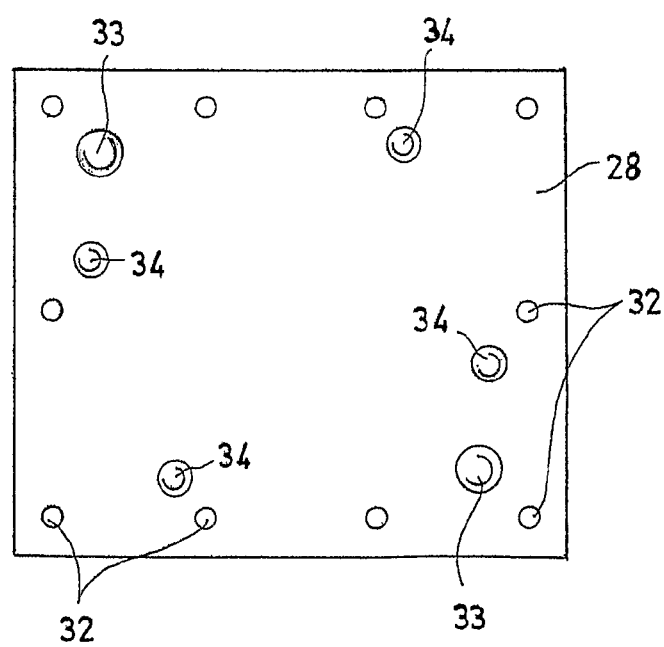
FIGS. 5 and 6 are respective plan views of a box-shaped casing and of a cover of an outer structure.

The cover 28, shown in FIG. 6, which can be made with a sheet of stainless steel of a thickness for example equal to four millimetres, has a plurality of holes 32 for receiving the sealing bolt 27, aligned with the analogous holes of the recessed body and of the box-shaped casing.

A plurality of threaded holes 33 and 34 are also made on the cover 28 to receive the fittings of the piping, not shown, to feed fluids to the recessed body 21, in particular the fluid in treatment and the additional load of water.

The device for the quick heating of fluid material, in particular for food, according to the present invention, as well as comprising the centrifugal fan 14 to ensure the necessary cooling of the microwave generator 12, can advantageously be equipped with interface systems with the unit as a whole, such as electrovalves, drive pumps, flow rate regulators and other known devices.

From what has been described above with reference to the figures, it is clear how a device for the quick heating of fluid material, in particular food, according to the invention is particularly useful and advantageous. The purpose mentioned in the preamble of the description is thus achieved.

Of course, the shapes of the device for the quick heating of fluid material, in particular food, of the invention, the amount of product to be treated and the temperatures to be reached can be different to that shown as a non-limiting example in the drawings, just as the materials can also be different.

The scope of protection of the invention is therefore defined by the attached claims.

The invention claimed is:

1. Device for the quick heating of fluid material, in particular food, comprising a container (20) for the fluid material and a heater (12), characterised in that said heater consists of a microwave generator (12), equipped at one end with an antenna (13) and in that said container (20) comprises a recessed treatment body (21) equipped with at least one recess (24) for the passage of said fluid material to be treated and with a seat (23) for receiving said antenna (13), said recessed treatment body (21) being enclosed in an airtight outer structure (28, 29) wherein said recessed treatment body (21) comprises at least one additional recess (25) for a protection load for the absorption of energy and said at least one recess (24) for the passage of said fluid material to be treated is substantially annular in shape and is arranged coaxially around said seat (23) for receiving said antenna (13).

2. Device according to claim 1, characterised in that said seat (23) for receiving said antenna (13) is arranged centrally in the recessed treatment body (21).

3. Device according to claim 1, characterised in that said additional load consists of water.

4. Device according to claim 1, characterised in that said seat (23) for receiving said antenna (13) and said at least one recess (24) for the passage of said fluid material to be treated are made on opposite faces of said recessed treatment body (21).

5. Device according to claim 1, characterised in that said at least one additional recess (25) for a protection load is made on the same face of said at least one recess (24) for the passage of said fluid material to be treated.

6. Device according to claim 1, characterised in that said at least one additional recess (25) for a protection load for the absorption of energy and said seat (23) for receiving said antenna (13) are arranged on opposite sides with respect to said at least one recess (24) for the passage of said fluid material to be treated.

7. Device according to claim 1, characterised in that said at least one additional recess (25) for a protection load are two recesses (25) arranged on diametrically opposite sides with respect to said at least one recess (24) for the passage of said fluid material to be treated.

8. Device according to claim 1, characterised in that said recessed treatment body (21) is made from a food-safe material transparent to microwaves.

9. Device according to claim 8, characterised in that said recessed treatment body (21) is milled from a full body of polytetrafluoroethylene (PTFE).

10. Device according to claim 8, characterised in that said recessed treatment body (21) is moulded or made with other technologies from glass, Pyrex, ceramic or another material suitable for use with food and transparent to microwaves.

11. Device according to claim 1, characterised in that said outer structure comprises a box-shaped casing (29) and a removable cover (28), clamped airtight towards the outside, said cover (28) being clamped airtight on a top face of said recessed treatment body (21).

12. Device according to claim 11, characterised in that said recessed treatment body (21), said box-shaped casing (29) and said cover (28) are respectively perimetrically equipped with a plurality of holes (26, 30, 32) aligned with each other, suitable for receiving bolts (27) for the seal.

13. Device according to claim 11, characterised in that said boxshaped casing (29) has a central through hole (31) for receiving said antenna (13) of the microwave generator (12).

14. Device according to claim 11, characterised in that said cover (28) has a plurality of threaded holes (33, 34) to receive fittings of piping for the supply of fluids to said recessed body (21).

15. Device according to claim 11, characterised in that said outer structure (28, 29) is made from stainless steel plate.

16. Device according to claim 1, characterised in that it comprises a centrifugal fan (14) for cooling said microwave generator (12).

17. Device according to claim 1, characterised in that said fluid material to be treated is milk or a water and powdered milk solution or other fluid products.

* * * * *